(12) United States Patent
Randazzo

(10) Patent No.: US 6,951,287 B1
(45) Date of Patent: Oct. 4, 2005

(54) RECEIVER HITCH MOUNTED BIKE RACK WITH ANTI-RATTLE MECHANISM

(75) Inventor: Steven J. Randazzo, San Jose, CA (US)

(73) Assignee: The Productive Edge, Inc., San Jose, CA (US)

(*) Notice: Subject to any disclaimer, the term of this patent is extended or adjusted under 35 U.S.C. 154(b) by 112 days.

(21) Appl. No.: 10/262,197

(22) Filed: Sep. 30, 2002

(51) Int. Cl.⁷ ................................................ A47F 7/00
(52) U.S. Cl. .................... 211/17; 224/924; 280/769; 280/506; 403/379.3
(58) Field of Search ............................ 211/17, 18, 19, 211/20, 21, 22, 23, 24; 224/536, 535, 537, 224/525, 524, 924; 280/506, 491.5, 769, 280/762, 495; 403/379.3, 379.4, 379.5, 109.5

(56) References Cited

U.S. PATENT DOCUMENTS

| | | | | |
|---|---|---|---|---|
| 3,604,734 A | * | 9/1971 | Friedman et al. | 403/104 |
| 3,782,761 A | * | 1/1974 | Cardin, Sr. | 280/507 |
| 5,025,932 A | * | 6/1991 | Jay | 211/20 |
| 5,244,133 A | * | 9/1993 | Abbott et al. | 224/521 |
| 5,344,175 A | * | 9/1994 | Speer | 280/506 |
| 5,423,566 A | * | 6/1995 | Warrington et al. | 280/415.1 |
| 5,476,203 A | * | 12/1995 | Fletcher | 224/536 |
| 5,497,967 A | * | 3/1996 | Gantois | 248/166 |
| 5,593,172 A | * | 1/1997 | Breslin | 280/506 |
| 5,690,260 A | * | 11/1997 | Aikins et al. | 224/505 |
| 5,947,357 A | * | 9/1999 | Surkin | 224/536 |
| 6,131,938 A | * | 10/2000 | Speer | 280/506 |
| 6,186,531 B1 | * | 2/2001 | Parent | 280/506 |
| 6,290,192 B1 | * | 9/2001 | Messerli | 248/188.5 |
| 6,334,561 B1 | * | 1/2002 | Cole | 224/521 |
| 6,357,780 B1 | * | 3/2002 | Young | 280/506 |
| 6,511,090 B2 | * | 1/2003 | Quanbeck et al. | 280/491.1 |
| 6,626,340 B1 | * | 9/2003 | Burgess | 224/536 |

* cited by examiner

*Primary Examiner*—Blair M. Johnson
(74) *Attorney, Agent, or Firm*—The Kline Law Firm

(57) ABSTRACT

A receiver hitch mounted bike rack with an anti-rattle mechanism includes a main tube that is received in the interior of a standard receiver hitch of a vehicle. The rack includes a pair of lateral wheel rails that each receive the front wheel or fork of a bike. An upright tube corresponding to each lateral wheel rail receives the bottom bracket of the bicycle. The bottom bracket rests in a groove on a top side of the upright tube, and the pedal arm is secured in the interior of the upright tube. One side of the upright tube, the side opposite the wheel, includes an elongated slot that accommodates the pedal of the bicycle.

4 Claims, 5 Drawing Sheets

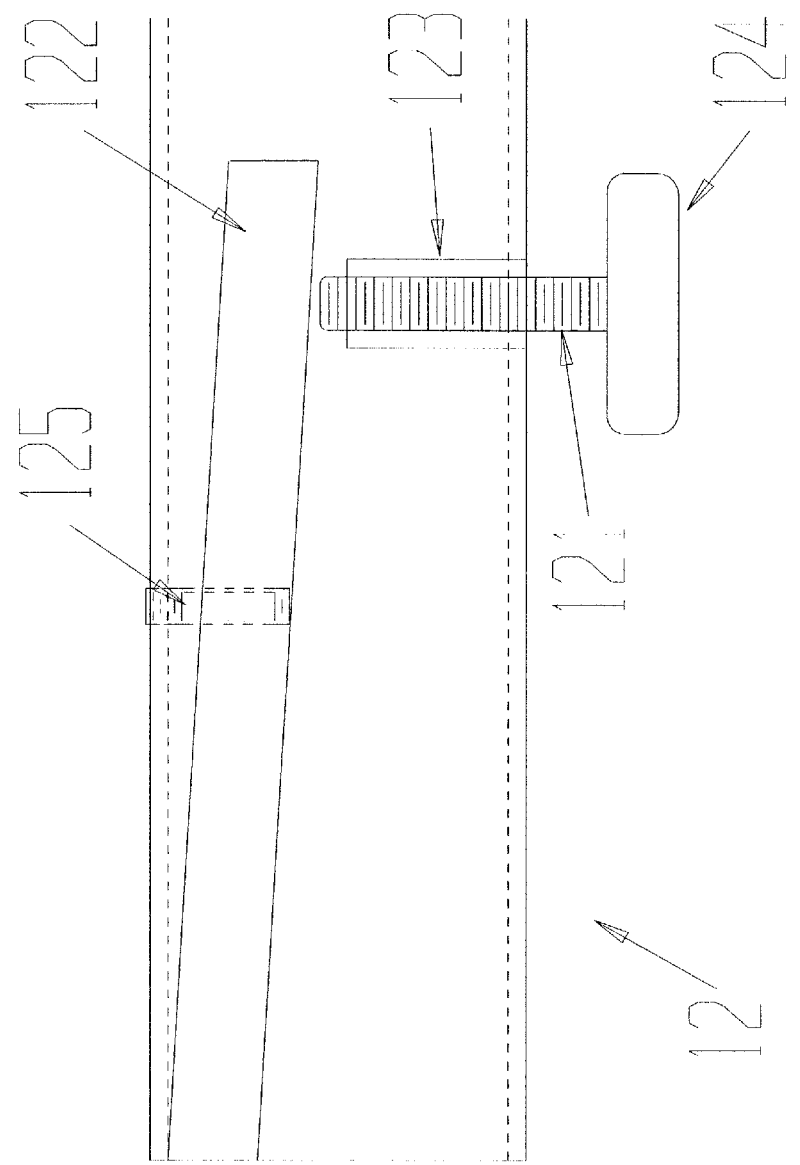

RECEIVER HITCH MOUNTED BIKE RACK WITH ANTI-RATTLE MECHANISM

BACKGROUND OF THE INVENTION

1. Field of the Invention

The present invention relates generally to bicycle carrying equipment, and more particularly is a receive hitch mounted bike rack that includes an anti-rattle mechanism.

2. Description of the Prior Art

Finding a safe and enjoyable place to ride a bicycle can be very challenging for the typical urban bicyclist. Typically, the bike rider must transport himself and his bicycle to a remote location, and then begin his ride. Since bicycles are fairly bulky, bike racks of many kinds have been designed to minimize the space required in the transport vehicles for the bicycles themselves.

One large class of bike racks includes those racks that are mounted on the roof of the rider's vehicle. While this solution minimizes space requirements, there being little other use for that particular space, loading and unloading the bicycles from a roof rack can be a difficult chore. At the very least, the rider is required to lift the bicycle above his head. Even reaching, let alone operating, attachment devices can be difficult at best, and the vehicle's paint job is often in substantial danger of damage.

Another large class of racks are those mounted on the rear bumper. While these racks are much easier to load and unload, the racks have serious weight restrictions due to the weight limitations of the bumper. The bumper is simply not designed to be a weight bearing fixture. Moreover, these racks tend to have a lack of stability, due in part to the desire to reduce the load on the bumper. The problems multiply if the user increases the number of bikes to be carried.

The most stable type of bike rack is a rack mounted on a trailer hitch. Because the trailer hitch is designed to support large weights, a much more substantial rack can be employed. However, added weight in the rack itself can lead to difficulty in handling the rack, such as when the user is installing the rack and removing the rack from the vehicle. In addition, the junction of the two heavy metal components, the trailer hitch and the bicycle rack, creates a significant rattling problem.

Accordingly, it is an object of the present invention to provide a bike rack that is securely mounted in a receiver type hitch.

It is a further object of the present invention to provide a rack that has an anti-rattle mechanism.

It is a still further object of the present invention to provide a rack that is relatively lightweight, and therefore easy to handle.

It is yet another object of the present invention to provide a rack that is modular, so that the carrying capacity can be easily increased.

SUMMARY OF THE INVENTION

The present invention is a receiver hitch mounted bike rack with an anti-rattle mechanism. The bike rack comprises a main tube that is received in the interior of a standard receiver hitch of a vehicle. The main tube of the rack is secured in the hitch tube by a standard hitch pin. The rack includes a pair of lateral wheel rails that each receive the front wheel or fork of a bike. An upright tube corresponding to each lateral wheel rail receives the bottom bracket of the bicycle. The bottom bracket rests in a groove on a top side of the upright tube, and the pedal arm is secured in the interior of the upright tube. One side of the upright tube, the side opposite the wheel, includes an elongated slot that accommodates the pedal of the bicycle.

The pedal arm can be further secured in the upright tube by a threaded clamping means. The clamping means is operated by hand, and has a cushioned contact pad on its inner end to avoid any damage to the pedal arm. When the clamping means is tightened on the pedal arm, the bike is more securely held in the bike rack so that the bike does not move within the rack.

In order to eliminate the rattling inherent in this type of hitch, an anti-rattle mechanism is included in the main tube. The anti-rattle mechanism comprises a threaded clamping rod mounted in the main tube. A flex rod has a first end affixed to a wall of the main tube, with the body of the flex rod extending into the interior of the main tube at an angle. A registration pin is secured in the flex rod so that it protrudes through the wall of the main tube. The user turns a knob on the clamping rod to advance the clamping rod into the interior of the main tube of the rack. When the clamping rod contacts the flex rod, the registration pin is driven into contact with the inner surface of the wall of the hitch tube. This forces the main tube into fixed contact with the hitch tube, thereby eliminating rattle between the two elements.

An advantage of the present invention is that by utilizing the existing hitch of a vehicle, the bike rack is far more securely mounted than many current art bike racks.

Another advantage of the present invention is that the anti-rattle mechanism eliminates the rattle between the bike rack and the receiver hitch.

A still further advantage of the present invention is that the modular design enables easy expansion to carry more bicycles and other equipment.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 5 is a side angular view of the anti-rattle mechanism in the main tube of the bike rack.

DETAILED DESCRIPTION OF THE INVENTION

Figure 1:
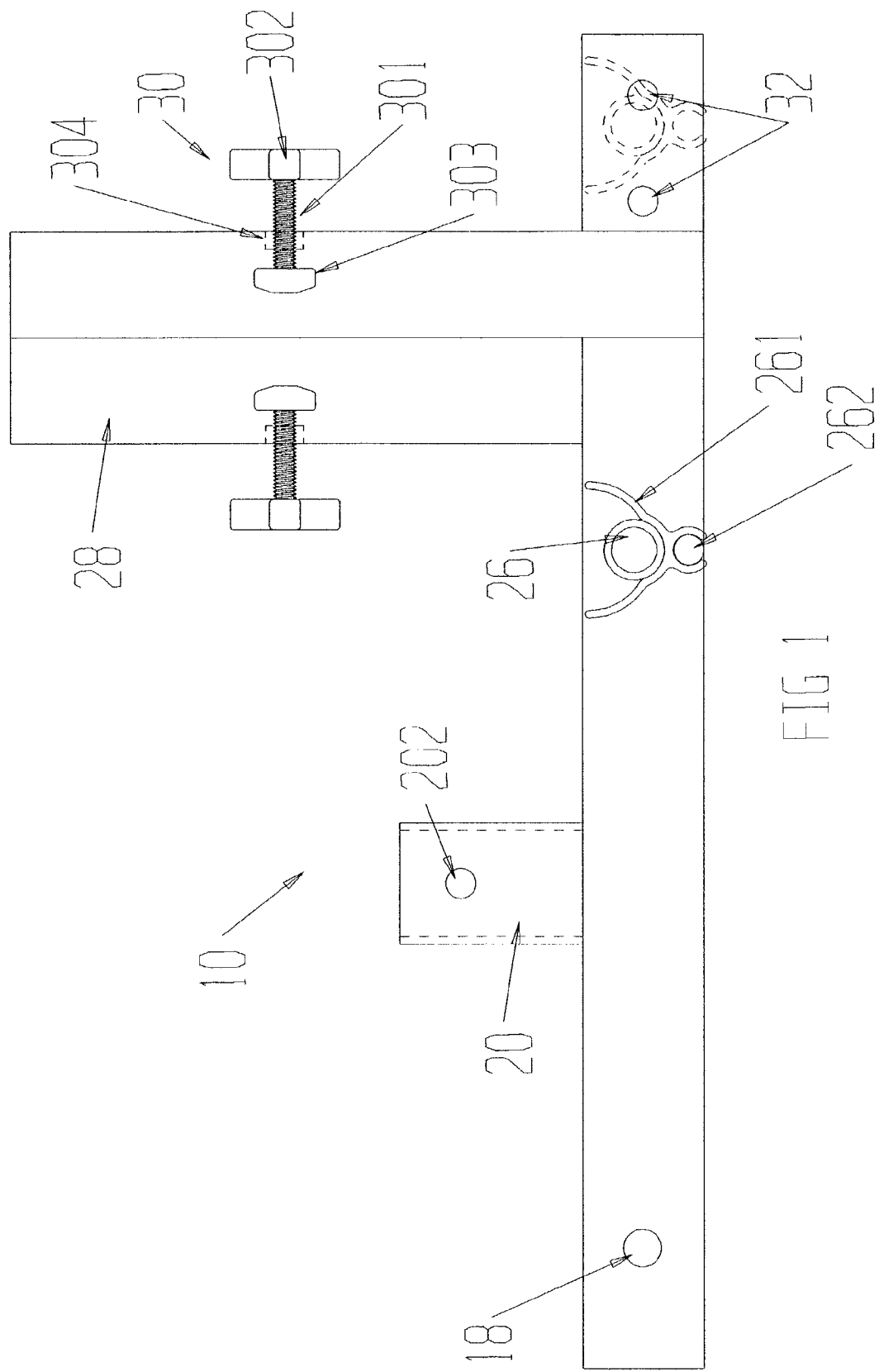
FIG. 1 is a side view of the receiver hitch mounted bike rack with an anti-rattle mechanism of the present invention.
Figure 2:
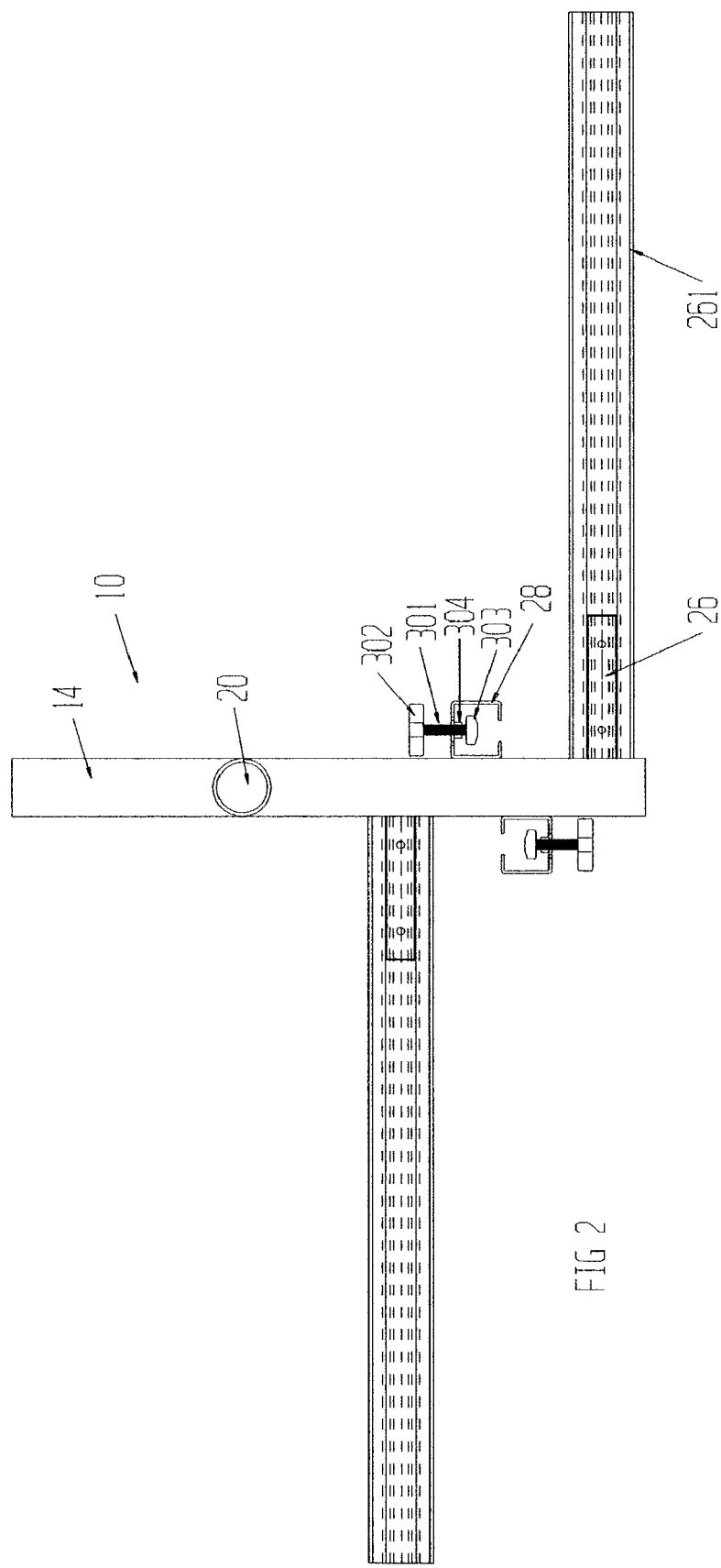
FIG. 2 is a top view of the bike rack.
Figure 3:
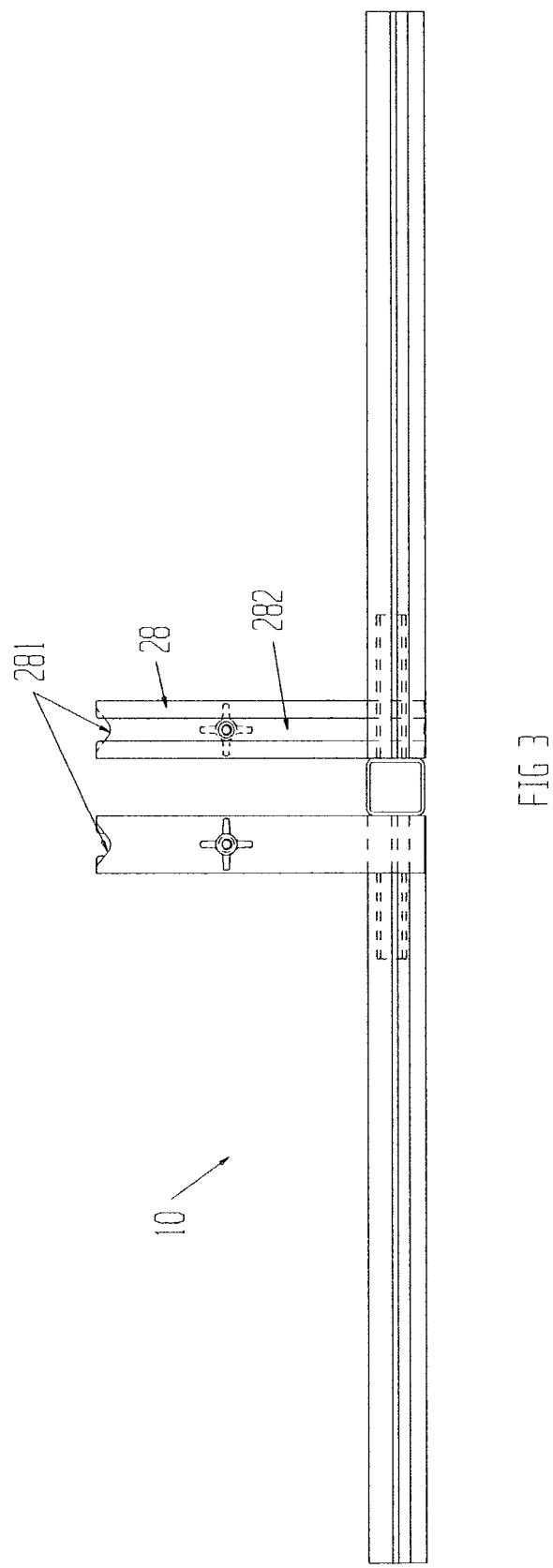
FIG. 3 is a rear end view of the bike rack.

Referring first chiefly to FIGS. 1–3, the present invention is a receiver hitch mounted bike rack 10 that includes an anti-rattle mechanism 12. The bike rack 10 comprises a main tube 14 that is received in the interior of a standard receiver hitch of a vehicle. The bike rack 10 is mounted on the vehicle by securing the main tube 14 of the rack 10 in the hitch tube 16 by a standard hitch pin (not shown). The hitch pin is received in an anchor hole 18 in a front end of the main tube 14.

An auxiliary equipment mounting socket 20 is situated on a top side of the main tube 14 behind the attachment point of the receiver hitch (which is defined by the anchor hole 18). The mounting socket 20 comprises a cylindrical tube with an auxiliary anchor hole 202 therein. The auxiliary equipment mounting socket 20 is used to install components such as a storage rack or other peripheral items. The base of the peripheral item is inserted into the mounting socket 20 and secured with a pin.

Behind the auxiliary equipment mounting socket 20, the bicycle holding units are mounted. Each holding unit comprises a pair of mirror image bike mounts 24. Each bike mount 24 comprises a lateral wheel rail mount 26 with a wheel rail 261 in a top side to receive the front wheel of a bike. If the front wheel has been removed for security, the front fork is received in the wheel rail 261. Each bike mount further comprises an upright tube 28 that receives the bottom bracket of the bicycle. The bottom bracket rests in a groove 281 on a top side of the upright tube 28. The pedal arm of the bicycle is secured in the interior of the upright tube 28. The side of the upright tube 28 that is opposite the wheel rail 261 includes an elongated slot 282 that accommodates the pedal of the bicycle.

A clamping means 30 is included in the upright tube 28 of the bike mount. In the preferred embodiment, the clamping means 30 comprises a threaded shaft 301 secured in a threaded receiver 304 in the upright tube 28. A knob 302 on the outer end of the threaded shaft 301 makes the clamping means easy to tighten by hand. The clamping means 30 also includes a cushioned contact pad 303 on its inner end to avoid any damage to the bicycle pedal arm.

Therefore, to mount the bicycle in the bike rack 10, the user places the front wheel or fork in the lateral wheel rail 261 of the bike mount so that the bottom bracket of the bike rests on the groove 281 of the upright tube 28. (Tie down straps that are attached in slot 262 are included on the wheel rail 261 to secure the wheel.) The pedal arm of the bike on the side of the upright tube 28 is oriented to point downward so that the pedal arm is received in the interior of the upright tube 28. The bike pedal passes through the elongated slot 282 as the bike is loaded, and extends through the slot 282 when the bike is at rest. After the pedal arm has been received in the upright tube 28, the bike is safely mounted in the bike rack 10. If the user wants to ensure that the bike does not move within the rack 10, the user tightens the clamping means 30 on the pedal arm, and the bicycle is even more securely stowed in the bike rack 10.

The capacity of the bike rack 10 can be easily increased by adding one or more additional units of the rack 10, or any other receiver hitch mounted accessories. To this end, the main tube 14 includes add-on anchor holes 32 near the outer end. The add-on anchor holes 32 receive a hitch pin to mount whatever unit is being added to the bike rack 10 by the user.

Figure 4:
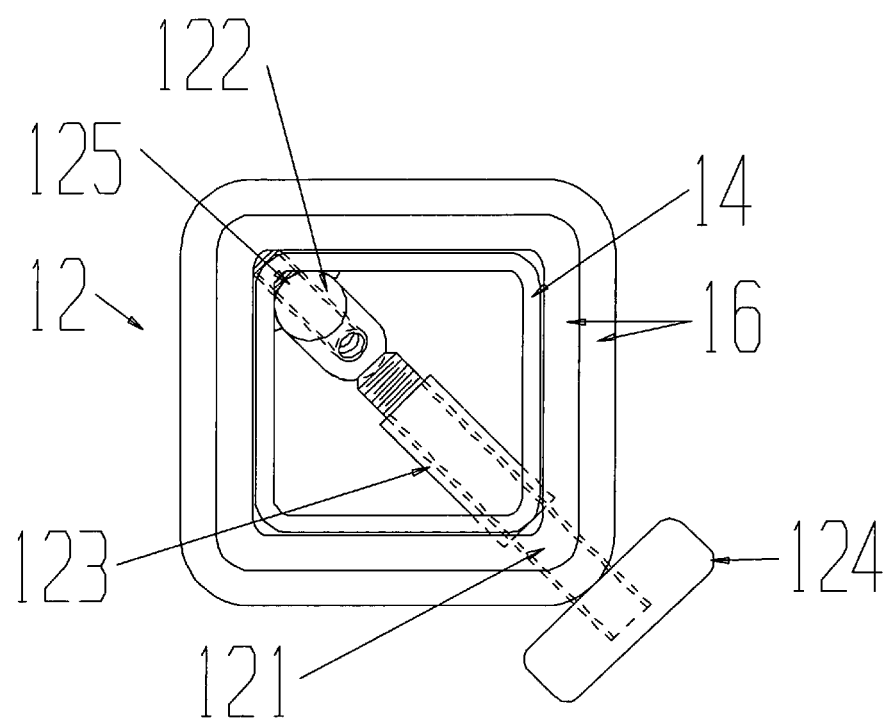
FIG. 4 is an end view of the main tube of the bike rack installed in the hitch tube illustrating the anti-rattle mechanism.

Referring now mainly to FIGS. 4 and 5, the anti-rattle mechanism 12 is included in the main tube 14 in order to eliminate the rattling inherent in a receiver hitch. The anti-rattle mechanism 12 comprises a threaded clamping rod 121 and a flex rod 122 mounted in the main tube 14. The flex rod 122 has a first end welded or otherwise rigidly affixed to an inner wall of the main tube, with the main body of the flex rod 122 extending into the interior of the main tube 14 at an angle. The clamping rod 121 is threaded into a thread nut 123 that is affixed to, or integral with, the wall of the main tube 14. A knob 124 is provided on the outer end of the clamping rod 121 to facilitate operation of the mechanism 12. The clamping rod 121 must be mounted so that it can contact the flex rod 122. In the preferred embodiment, the flex rod 122 is mounted on a diagonal plane of the main tube 14 to maximize the effect of the anti-rattle mechanism 12.

A registration pin 125 is secured in the flex rod 122 so that the registration pin 125 protrudes through the wall of the main tube 14. When the bike rack 10 is installed in the receiver hitch, the user actuates the anti-rattle mechanism 12 by turning knob 124 to advance the clamping rod 121 into the interior of the main tube 14 of the bike rack 10. When the clamping rod 121 contacts the flex rod 122, the registration pin 125 is urged into contact with the inner surface of the wall of the hitch tube 16 of the receiver hitch. This forces the main tube 14 of the rack 10 into fixed contact with the wall of the hitch tube 16, thereby eliminating rattle between those two elements.

If the registration pin 125 is threaded into the flex rod 122, the stroke of the flex rod 122 can be easily adjusted. That is, the amount of rotation required of the clamping rod 121 can be adjusted by adjusting the at-rest distance between the distal end of the registration pin 125 and the hitch tube 16.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A bicycle rack comprising:
a main tube,
at least a first bicycle holding unit affixed to said main tube, and
an anti-rattle mechanism; wherein
said bicycle holding unit comprises at least one bike mount, said bike mount comprising at least one lateral wheel rail and a corresponding upright post, said lateral wheel rail receiving a front wheel or fork of a bicycle, and said upright post including means adapted for securing a pedal arm of the bicycle, and
said anti-rattle mechanism comprises
a threaded clamping rod and a flex rod mounted in said main tube, said flex rod having a first end affixed to a wall of said main tube, and a main body of said flex rod extending into an interior of said main tube at an angle,
said clamping rod being threaded into a thread nut that is affixed to said wall of said main tube, said clamping rod being mounted at a position wherein it contacts said flex rod when said clamping rod is advanced, and
a registration pin secured in said flex rod so that said registration pin protrudes through said wall of said main tube; wherein
a user actuates said anti-rattle mechanism by advancing said clamping rod into said interior of said main tube, said clamping rod contacting said flex rod, thereby urging said registration pin into contact with an inner surface of a wall of a tube receiving said main tube of said bicycle rack.

2. The bicycle rack of claim 1 wherein:
said flex rod is mounted so as to flex in a diagonal plane of said main tube.

3. The bicycle rack of claim 1 wherein:
said registration pin is movably secured in said flex rod, a stroke of said flex rod being adjusted by movement of said registration pin to modify a distance between a distal end of said registration pin and the wall of the tube receiving said main tube of said bicycle rack.

4. The bicycle rack of claim 3 wherein:
said flex rod is mounted so as to flex in a diagonal plane of said main tube.

* * * * *